United States Patent [19]
McCormick

[11] Patent Number: 5,845,886
[45] Date of Patent: Dec. 8, 1998

[54] ADJUSTABLE CEILING FAN SUPPORT ASSEMBLY

[76] Inventor: Henry McCormick, 1960 Worley La., Montgomery, Ala. 36106

[21] Appl. No.: 686,556

[22] Filed: Jul. 26, 1996

[51] Int. Cl.[6] .................................................. E04G 25/00
[52] U.S. Cl. ...................... 248/200.1; 248/906; 248/343; 416/246; 416/5
[58] Field of Search ................... 416/5, 246; 248/300, 248/200.1, 343, 342, 48.1, 906, 323, 333, 298.1

[56] References Cited

U.S. PATENT DOCUMENTS

| | | | |
|---|---|---|---|
| 493,305 | 3/1893 | Sherman . | |
| 1,550,751 | 8/1925 | Sinkler | 269/97 |
| 1,756,361 | 9/1926 | Johnson | 248/906 |
| 2,140,861 | 12/1938 | Stakatee | 247/22 |
| 2,706,132 | 4/1955 | Chaffin . | |
| 3,487,449 | 12/1969 | Maidl . | |
| 3,552,650 | 1/1971 | Patrick | 239/8 |
| 4,463,923 | 8/1984 | Reiker | 248/546 |
| 4,538,786 | 9/1985 | Manning | 248/544 |
| 4,762,463 | 8/1988 | Yang | 416/5 |
| 4,878,806 | 11/1989 | Markwardt | 416/170 |
| 4,972,339 | 11/1990 | Gabrius | 248/343 |
| 5,024,412 | 6/1991 | Hung et al. | 248/343 |
| 5,044,582 | 9/1991 | Walters | 249/343 |
| 5,192,111 | 3/1993 | Hanemaayer | 296/163 |
| 5,222,864 | 6/1993 | Pearce | 416/5 |
| 5,230,545 | 7/1993 | Huang et al. | 296/95.1 |
| 5,232,347 | 8/1993 | VonBergen | 416/244 |
| 5,303,894 | 4/1994 | Deschamposat et al. | 248/906 |
| 5,462,412 | 10/1995 | Scofield et al. | 416/210 R |
| 5,567,117 | 10/1996 | Gunn et al. | 416/244 R |

FOREIGN PATENT DOCUMENTS

| | | |
|---|---|---|
| 2839557 | 3/1980 | Germany . |
| 862309 | 3/1961 | United Kingdom . |

*Primary Examiner*—Leslie A. Braun
*Assistant Examiner*—Kimberly Wood
*Attorney, Agent, or Firm*—Richard C. Litman

[57] ABSTRACT

An adjustable ceiling fan support assembly for use in recreational vehicles, motor homes, camper shells and the like to removably suspend a ceiling fan from opposing vertical supports. A spring-biased adjustable fan support is interposed between two vertical supports, such as the interior walls of a recreational vehicle or retractable awning frames, and the fan is suspended from the support. The support includes a pair of generally parallel, elongated support arms having a fixed component and a reciprocable component. The fixed component depends from diametrically opposed edges of a plate. The reciprocable component has an engaging end portion, slidably engaged with the fixed component, and a wall engaging end. Each support arm further has a coil spring operably disposed between the fixed component and the reciprocable component so as to cause a biasing force of the reciprocable component away from the fixed component, whereby each reciprocable member may be compressed and interposed between two vertical surfaces and released to engage an associated vertical surface to suspend the fan. The fan may be specially adapted for use with a 12V DC current supplied by most RVs, and have easily removable fan blades.

11 Claims, 3 Drawing Sheets

ADJUSTABLE CEILING FAN SUPPORT ASSEMBLY

BACKGROUND OF THE INVENTION

1. Field of the Invention

The present invention relates to an adjustable support for a ceiling fan, more particularly, a support assembly for use in recreational vehicles, motor homes, camper shells and the like to removably suspend a ceiling fan.

2. Description of Prior Art

Ventilating and cooling of recreational vehicles (RVs) is a problem. When the RV is parked, it is often desirable to open the cabin and awnings and sit back and enjoy the outside air and scenery. However, the air is stale or stagnant, particularly on hot days when a breeze would be desired. A ceiling fan would generate such a breeze. However, the vertical supports of an RV awning structure or interior are ill suited to a ceiling fan.

Inventions which have been directed at the art of ventilation are generally limited to residential structures and fail to teach the application of a removable, storable ceiling fan, particularly for use in the narrow confines, in the low headroom, and with the low voltage power supply of a recreational vehicle. A typical example of a popular commercially available ceiling fan for residential 110 V AC current use is the Hunter® brand fan. One such Hunter® fan is shown in U.S. Pat. No. 5,462,412 issued Oct. 31, 1995 to Scofield et al., which describes a ceiling fan with detachable fan blades. Such fans are typically mounted by a mounting bracket and threaded screws fastened directly to receiving holes of a standard electrical junction box, which is in turn recessed into the ceiling and attached between the support rafters of the ceiling. The threaded receiving holes are positioned in the brackets and junction boxes according to a standardized spacing in the industry. Such an arrangement is clearly unsuitable for use with a motor vehicle body; however, the standardized nature of the mounting bracket may be used to great advantage in the present invention.

Other structures adapted for lateral support of ventilation units are also known. U.S. Pat. No. 493,305 issued Mar. 14, 1893 to Sherman generally describes a canopy with vertical legs and having a slidably adjustable horizontal support member which is used to suspend a fan over a bed.

Most notably, however, U.S. Pat. No. 5,232,347 issued Aug. 3, 1993 to VonBergen describes a fan and mounting structure which allows the fan to be mounted laterally to the side of a vertical surface. A major disadvantage of such a configured bracket is its inability to be easily removed from its supporting vertical surface. Moreover, headroom under the awning of a recreational vehicle is limited and repeated and frequent removal of the unit is necessary to move the RV. Installation and removal of the '347 device would result in eventual fatigue and weakening of the fastener or its receiving surface.

In the art of recreational vehicles, various sliding and retractable mechanisms have been developed for use with tent trailers, canopied campers and the like. However, none teach a use with a ceiling fan. For example, U.S. Pat. No. 3,487,449 issued Dec. 30, 1969 to Maidl describes parallel telescoping support members which extend from a vehicle and hold up a canopy or awning. U.S. Pat. No. 5,230,545 issued Jul. 27, 1993 to Huang, U.K. Pat. Specification No. 862,309 and German Offenlegungschrift 28 39 557 each describe various retractable awnings for the roof of a motor vehicle. U.S. Pat. No. 2,706,132 issued Apr. 12, 1955 to Chaffin describes a roll away awning for house trailers. U.S. Pat. No. 5,192,111 issued Mar. 9, 1993 to Hanemaayer describes a built-in awning system for the exterior of a recreational vehicle.

Thus, an adjustable and easily removable ceiling fan support assembly solving the aforementioned problems is desired. None of the above inventions and patents, taken either singularly or in combination, is seen to describe the instant invention as claimed.

SUMMARY OF THE INVENTION

The present invention relates to an adjustable support for a ceiling fan, more particularly, a support assembly for use in recreational vehicles, motor homes, camper shells and the like to removably suspend a ceiling fan from opposing vertical supports. A spring-biased adjustable fan support is interposed between two vertical supports, such as the interior walls of a recreational vehicle or retractable awning frames, and the fan is suspended from the support. The support includes a pair of generally parallel, elongated support arms having a fixed component and a reciprocable component. The fixed component depends from diametrically opposed edges of a plate. The reciprocable component has an engaging end portion, slidably engaged with the fixed component, and a wall engaging end. Each support arm further has a coil spring or other spring-biasing means operably disposed between the fixed component and the reciprocable component so as to cause a biasing force of the reciprocable component away from the fixed component, whereby each reciprocable member may be compressed and interposed between two vertical surfaces and released to engage an associated vertical surface to suspend the fan. The fan may be specially adapted for use with a 12V DC current supplied by most RVs, and have easily removable fan blades.

Accordingly, it is a principal object of the invention to provide a ceiling fan support bracket for interposition between generally parallel, vertical supports.

It is another object of the invention to provide a means to provide a ceiling fan support bracket which is adjustable in length.

It is a further object of the invention to provide an assembly of components which provide means to allow convenient, easy and repeated installation and removal of the fan and its support.

Still another object of the invention is to provide a kit of components which can be compactly stored.

It is an object of the invention to provide improved elements and arrangements thereof in an adjustable ceiling fan support assembly for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention relates to an adjustable support for a ceiling fan, more particularly, a support assembly for use in motor homes, recreational vehicles, camper shells and the like to removably suspend a ceiling fan.

Figure 1:
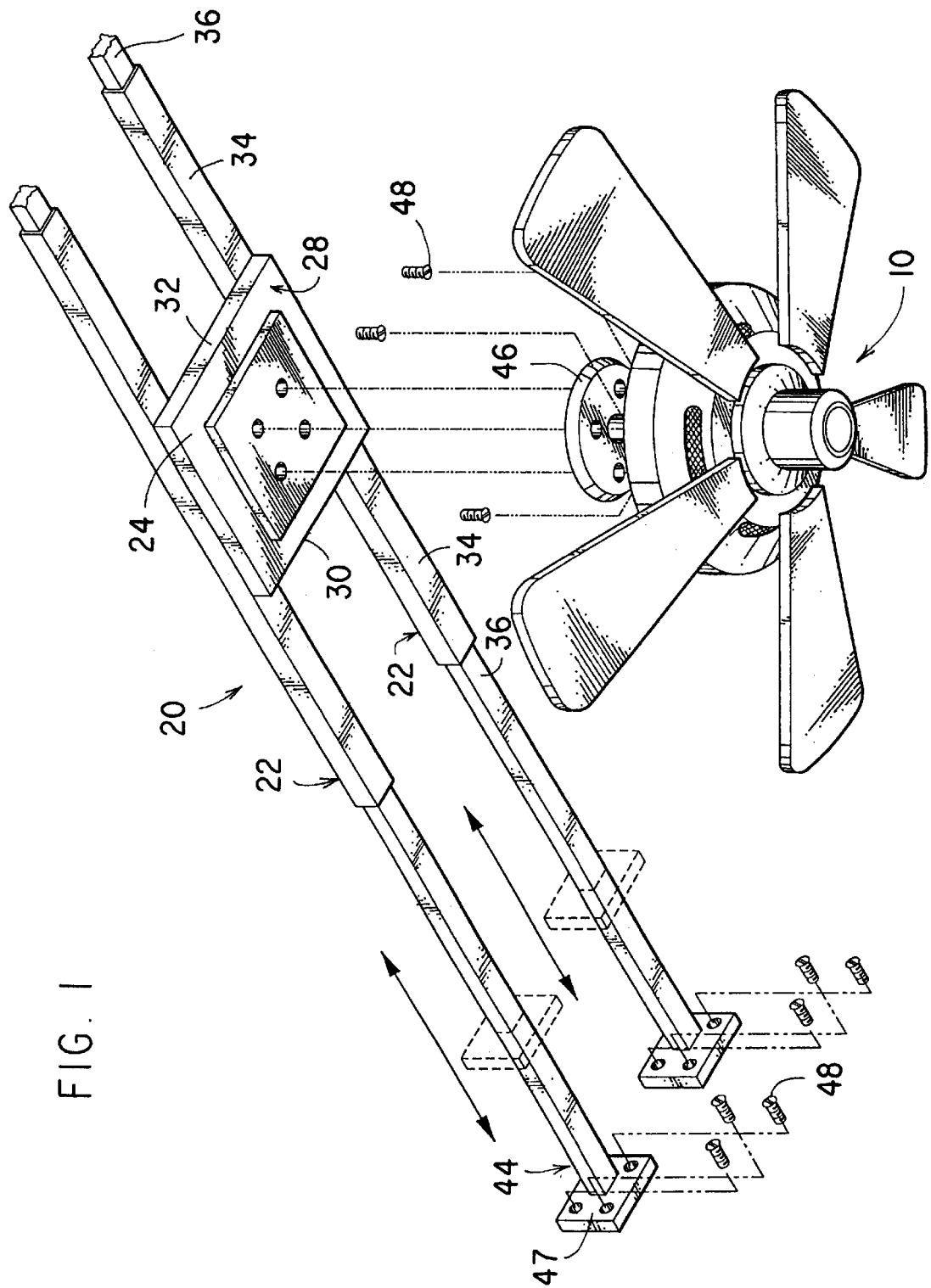
FIG. 1 is an partially exploded and partially fragmented, perspective view of an adjustable ceiling fan support and fan assembly according to the present invention.

Referring to FIG. 1, a standard fan 10 and an adjustable fan support 20 are represented as assembled in a functional relationship wherein the support 20 is interposed between two vertical supports, such as the interior walls of a recreational vehicle or the frame components of an awning, and the fan 10 is suspended from the support 20. Recreational vehicles (RVs) should be understood to mean any mobile structure typically used for temporary residence in conjunction with a motor vehicle. Examples of RVs include motor homes, camper shells of both the trailered and retrofit types for truck beds, motorized campers, and the like, as popularized by Airstream® and Winnebago® RVs. Many of these RVs have retractable or removable awnings having a bar distal from the outside wall of the RV, providing an additional support point for attachment of the present invention.

In order to accommodate the varying widths of the interiors of such RVs, the support 20 must be horizontally adjustable to fit between the vertical supports of the RV. Means to accomplish this objective are shown by the preferred embodiment in FIG. 1 and FIG. 2, featuring a pair of slidable, adjustable support arms 22. Each arm 22 is affixed generally parallel to the other on a generally rectangular plate 24 having an upper surface 26 and a lower surface 28 with diametrically opposed edges 30,32.

Each arm 22 is elongated having a predetermined maximum length when fully extended to exceed the width of most RV interiors and awning frames. Obviously, various standard lengths may be provided to range in size to accommodate the smallest of camper shells to the largest of motor homes. In the preferred embodiment, the slidably adjustable support arm 22 includes a fixed component 34 and a reciprocable component 36 biased against one another internally by means of a coil spring 50. Such arrangement is suited to accomplish the purpose of being adjustable in length as well as the purpose of supporting the fan in a repeatedly removable manner.

Figure 2:
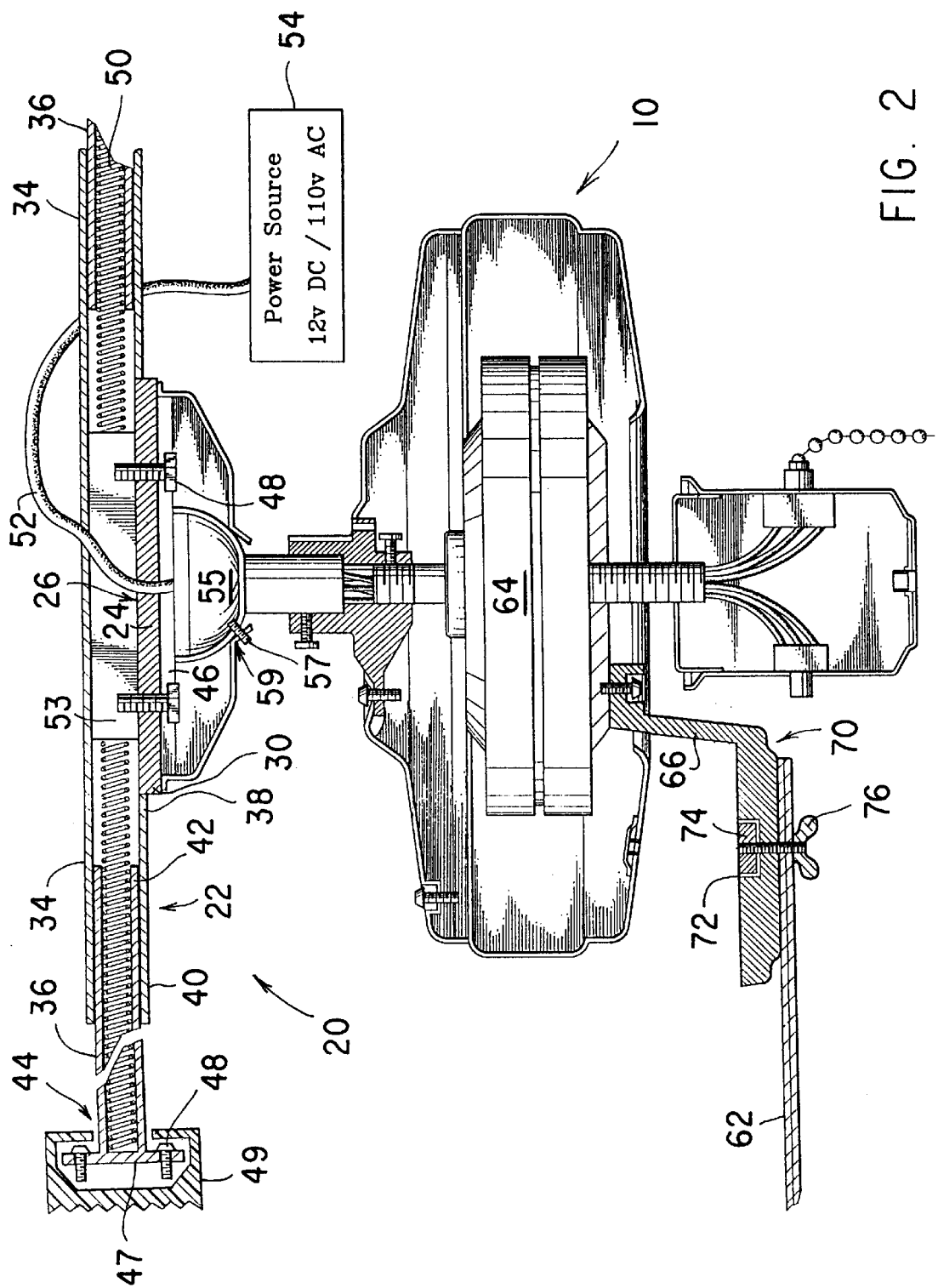
FIG. 2 is a partially broken, sectional view of the adjustable ceiling fan support and fan assembly according to the present invention.

Referring to FIG. 2 for clarity, the fixed component 34 has a first end portion 38, being affixed transversely to the plate 24 and extending beyond an edge 30 of the plate 24. The fixed component 34 is shown as a hollow tube having a second end portion 40 distal from the plate 24. The measured distance from the terminus of the second end portion 40 to the center of the plate 24 is preferably less than the measured radius of the fan 10 in the plane of its fan blades, thereby allowing the reciprocable component 36 to be slidably adjusted to decrease the overall length of the arm 22 to approximate the length of the fixed component 34. The reciprocable component 36 is also shown as a hollow tube having an outer diameter slightly smaller than the inner diameter of the second end portion 42, thereby forming an engaging end portion 42 of the reciprocable member 36 which is slidably engaged with the second end portion 40 of the fixed component 34.

Each support arm 22 further has a coil spring or other spring-biasing means 50 internally disposed between the fixed component 34 and the reciprocable component 36, so that when the components are compressed inwardly relative to one another, a biasing force is exerted on the reciprocable component 36 to force it away from the fixed component 34 when the reciprocable component is released. As shown in the preferred embodiment, a stop member 53 may be internally disposed within the fixed component 34 against which the coil spring 50 can act, although other biasing assemblies can be envisioned. The spring-biasing means 50 must however be positioned between the fixed component 34 and the reciprocable component 36 so that at least two states are allowed: 1) a compressed state wherein an incrementally increasing biasing force is exerted upon the reciprocable component away from the fixed component as the reciprocable component 36 is gradually slidably received by the fixed component 34, and 2) a resting state with minimal or no biasing force when the reciprocal component 36 is nearly fully extended relative to the fixed component 34 yet still remains slidably attached to the fixed member. The resting state may be simply accomplished by using a coil spring 50 of a predetermined length less than that of the combined lengths of the fixed component and reciprocable component when slidably engaged.

The preferred embodiment of the support 20 is arranged so that support arms 22 extend continuously from the centerline of the plate outwardly beyond both edges 30 and 32, in an essentially symmetrical and identical manner. At the terminus of each arm 22, the reciprocal component 36 has a wall engaging end 44. A flange 47 may be provided, which is affixed to perpendicularly extend from the wall engaging end 44 of each support arm 22 and further defines apertures for the passage of fasteners 48. In the alternative, a rubberized boot 49 may be attached to the wall engaging end 44 to provide frictional resistance against a vertical surface when the support arm 22 is in a compressed state. It should be noted that when the support 20 relies solely on frictional resistance to suspend a fan, the spring-biasing means 50 should be chosen to exert a sufficient force when compressed to support both the weight of the support 20 and a maximum weight of a fan.

Obviously, other embodiments of the support 20 can be envisioned; for example, the support arms may be welded directly to the edges of the plate, instead of extending continuously across the upper surface 26 of the plate 24. Likewise, the fixed component may be a rod instead of a hollow tube which inserts into the reciprocable component. Moreover, the tubular supporting components may be channelled and U-shaped to engage with one another. Although many other embodiments of the preferred embodiment of the support 20 can be envisioned, each is understood to be encompassed within the spirit of the present invention and therefore, the present invention is not to be limited to the description of the preferred embodiment.

Figure 3:
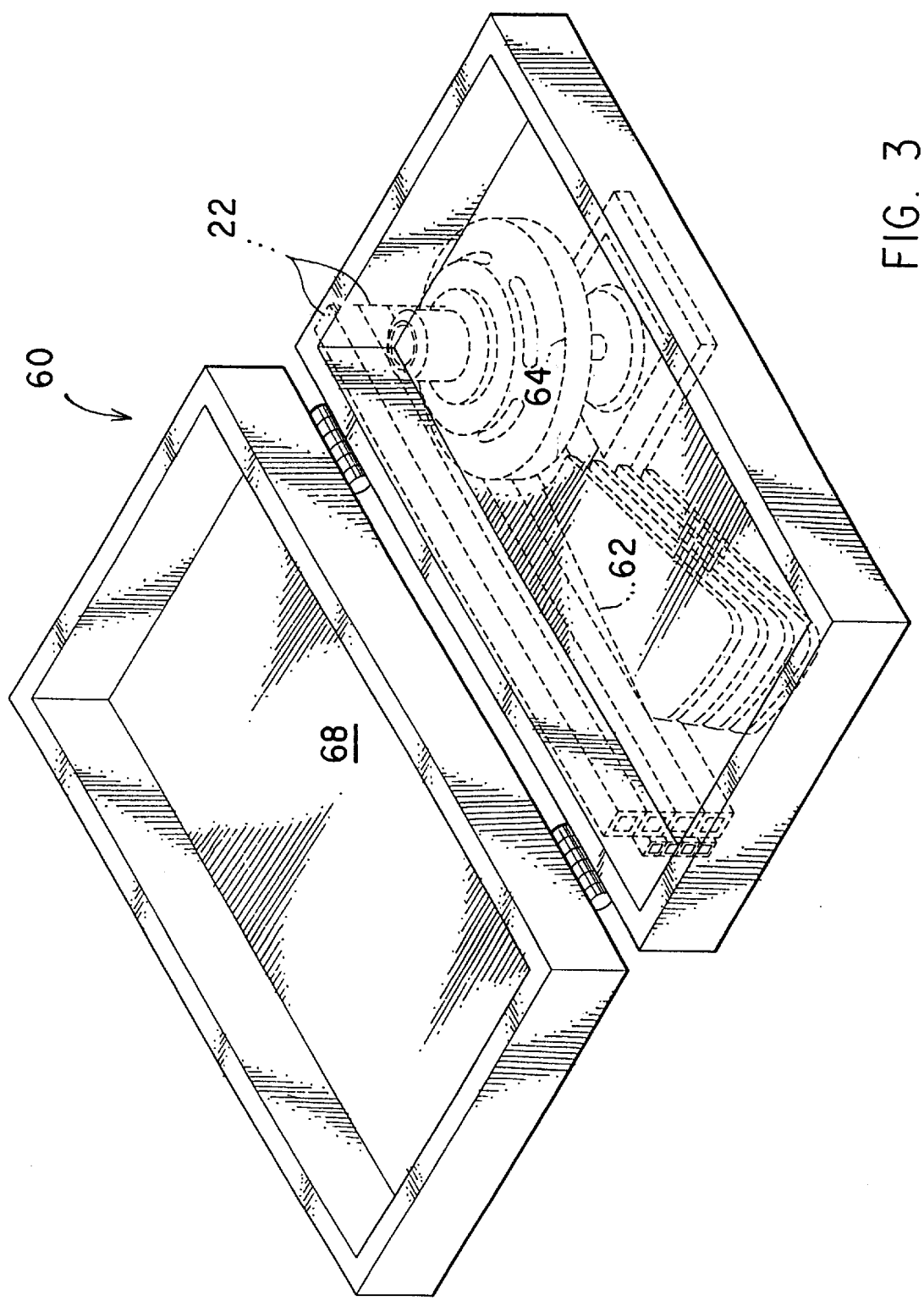
FIG. 3 is a perspective view of a kit showing a possible arrangement in phantom lines of the removable components of the adjustable ceiling fan support and fan assembly in a stored configuration.

The fan 10 which is attached to the support 20 may be chosen from a standard, commercially available brand. However, if combined with the support 20 as a kit 60, as shown in FIG. 3, the fan 10 may be modified specifically for use in RVs. First, a plate mating means 46 is provided which is configured to mate with plate 24. The plate mating means 46 as shown in the FIG. 2 may be a second plate or bracket configuring to attach to plate 24, and may be provided with appropriate fasteners 48 to fasten the plates in a contiguous array. Any appropriate mating means as known in the prior art may be used to adapt to plate 24. Moreover, plate 24 may be adapted to take advantage of existing coupling components of commercially available fans.

Second, the fan 10 provided in the kit 60 is a motorized ceiling fan having a flexible power cord 52, such as a helically wound cord, with means known in the prior art for manually plugging to a power source 54, such as a standard two or three prong plug for 110 V AC use or a cigarette lighter adapter for 12 V DC use. As used in the kit, the motorized ceiling fan 10 and the power cord 52 both should be adapted for use with either a 12 Volt DC power source or a 110 Volt AC power source. When the fan is used with an awning frame, the support arms 22 may be positioned in a non-horizontal plane relative to the ground. Therefore, the fan is further provided with a swivel neck 55, known in the prior art, and a locking means, such as an alien screw 57 disposed in matingly threaded bore 59 defined by the plate mating means 46. The swivel neck locking means are disposed in the plate mating means for preventing motion of the swivel neck while suspended from the awning, but may be disengaged for removal of the fan.

To further facilitate easy storage, the fan 10 includes a plurality of removable blades 62 attached to the fan motor 64 by attachment means 70 for removably attaching each of the plurality of removable blades. These attachment means, too, may be chosen from the prior art. However, a simple arrangement for attaching each blades 62 to the attachment means 70 is shown in FIG. 2. The attachment means include a bracket 66 defining a square recess 72 for receiving a common square nut 74. The blade 62 is secured by a thumb screw bolt 76 matingly threaded with the square nut. The bolt has a winged head for easy manipulation. Although the bracket is shown having a square nut and a recess, the bracket itself may be matingly threaded to receive the thumb screw bolt 76. Finally, the entire assembly may be disassembled and stored in case 68 for storage as shown in FIG. 3.

It is to be understood that the present invention is not limited to the embodiment described above, but encompasses any and all embodiments within the scope of the following claims.

I claim:

1. An adjustable ceiling fan support assembly comprising:
   a plate having an upper surface and a lower surface, and diametrically opposed edges;
   at least two elongated support arms having a fixed component and a reciprocable component,
   the fixed component having a first end portion depending from each of the diametrically opposed edges of the plate, and a second end portion,
   the reciprocable component having an engaging end portion being slidably engaged with the second end portion of the fixed component, and a wall engaging end,
   a boot attached to the wall engaging having apertures with fasteners therein end for frictionally engaging a vertical support structure,
   each support arm further having a coil spring disposed between the fixed component and the reciprocable component such that when said coil spring is compressed the reciprocable component is biased away from the fixed component; and,
   a fan suspended from the lower surface of the plate.

2. The adjustable ceiling fan support assembly as defined in claim 1 wherein the fan is motorized and further including a power cord and power supply adapted for use with a 12 Volt DC power source.

3. The adjustable ceiling fan support assembly as defined in claim 1 wherein the fan is motorized, including a power cord adapted for use with a 110 Volt AC power source.

4. The adjustable ceiling fan support assembly as defined in claim 1 wherein the fan is motorized, including a fan motor, a plurality of removable blades, and means to removably attach each of the plurality of removable blades to the fan motor.

5. A kit providing a combination of components for installation and storage of a removable fan, comprising:
   an adjustable ceiling fan support including:
      a plate having an upper surface and a lower surface, and diametrically opposed edges;
      at least two elongated support arms having a fixed component and a reciprocable component,
      the fixed component having a first end portion depending from each of the diametrically opposed edges of the plate, and a second end portion,
      the reciprocable component having an engaging end portion being slidably engaged with the second end portion of the fixed component, and a wall engaging having apertures with fasteners therein end,
      a boot attached to the wall engaging end for frictionally engaging a vertical support structure,
      each support arm further having a coil spring disposed between the fixed component and the reciprocable component such that when the coil spring is compressed the reciprocable component is biased away from the fixed component; and,
   a motorized ceiling fan having a flexible power cord with means for manually plugging to a power source, said fan further including means for securing the motorized ceiling fan to the plate, a swivel neck depending from the securing means and locking means for preventing motion of the swivel neck.

6. The kit as defined in claim 5 wherein the motorized ceiling fan and the power cord are adapted for use with a 12 Volt DC power source.

7. The kit as defined in claim 5 wherein the motorized ceiling fan and the power cord are adapted for use with a 110 Volt AC power source.

8. The kit as defined in claim 5 wherein the motorized ceiling fan includes a fan motor, a plurality of removable blades, and means to removably attach each of the plurality of removable blades to the fan motor.

9. The kit as defined in claim 8 wherein the means to removably attach each of the plurality of removable blades to the fan motor includes a bracket having a first surface and an opposite second surface defining an irregularly shaped recess, a through bore depending from the irregularly shaped recess to the first surface, an irregularly shaped threaded nut received in the irregularly shaped recess and a matingly threaded thumb screw bolt.

10. The kit as defined in claim 8 wherein the means to removably attach each of the plurality of removable blades to the fan motor include a bracket having a threaded bore and a matingly threaded thumb screw bolt.

11. The kit as defined in claim 5 including a case for storage of the motorized ceiling fan and adjustable ceiling fan support.

* * * * *